United States Patent [19]

Durfee

[11] Patent Number: 5,227,448
[45] Date of Patent: Jul. 13, 1993

[54] METHOD FOR PREPARING ORGANOFUNCTIONAL POLYSILOXANES

[75] Inventor: Loren D. Durfee, Midland, Mich.

[73] Assignee: Dow Corning Corporation, Midland, Mich.

[21] Appl. No.: 888,080

[22] Filed: May 26, 1992

[51] Int. Cl.$^5$ .............................................. C08G 77/06
[52] U.S. Cl. ........................................ 528/15; 528/25; 528/31; 525/479
[58] Field of Search .................... 528/15, 25, 31; 525/479

[56] References Cited

U.S. PATENT DOCUMENTS

| | | | |
|---|---|---|---|
| 2,851,473 | 9/1958 | Wagner et al. | 260/448.2 |
| 3,440,263 | 4/1969 | Brennan | 260/448.2 |
| 4,166,078 | 8/1979 | Getson | 528/26 |

FOREIGN PATENT DOCUMENTS 2166867 11/1971 Fed. Rep. of Germany.
1104206 3/1966 United Kingdom.

Primary Examiner—Melvyn I. Marquis
Attorney, Agent, or Firm—William F. Boley

[57] ABSTRACT

The present invention is novel cross-linked organofunctional polysiloxane and organofunctional cyclosiloxane compositions and a process for their preparation. The process for preparation of these siloxane compositions comprises contacting a mixture comprising a poly(organohydrogen)siloxane or a cyclo(organohydrogen)siloxane, a alpha,omega-triene, and a triorganosilyl source with a platinum catalyst, at a temperature within a range of 50° C. to 200° C. The products of this process are cross-linked organofunctional polysiloxanes and cross-linked organofunctional cyclosiloxanes. The triorganosilyl source added to the process provides for control of the amount of cross-linking of the organofunctional polysiloxanes and cyclosiloxanes independent of the level of organofunctionality.

32 Claims, No Drawings

METHOD FOR PREPARING ORGANOFUNCTIONAL POLYSILOXANES

BACKGROUND OF INVENTION

The present invention is novel cross-linked organofunctional polysiloxane and organofunctional cyclosiloxane compositions and a process for their preparation. The process for preparation of these siloxane compositions comprises contacting a mixture comprising a poly(organohydrogen)siloxane or a cyclo(organohydrogen)siloxane, a alpha,omega-triene, and a triorganosilyl source with a platinum catalyst, at a temperature within a range of 50° C. to 200° C. The products of this process are cross-linked organofunctional polysiloxanes and cross-linked organofunctional cyclosiloxanes. The triorganosilyl source added to the process provides for control of the amount of cross-linking of the organofunctional polysiloxanes and cyclosiloxanes independent of the level of organofunctionality.

The reaction of olefins with SiH-containing compounds is well known. For example, Wagner et al., U.S. Pat. No. 2,851,473, issued Sep. 9, 1958, describe the use of platinum deposited on the gamma allotrope of alumina to catalyze the reaction between molecules containing C=C bonds and SiH containing monomers.

British Patent No. 1,104,206, published Feb. 21, 1968, describes a process where a silicon compound containing at least one silicon-bonded hydrogen atom per molecule and not more than two hydrogen atoms attached to any one silicon atom is reacted with a compound containing aliphatically unsaturated carbon atoms in the presence of a platinum complex. Specific examples of compounds containing aliphatically unsaturated carbon atoms include compounds containing one and two unsaturated bonds.

German Patent Application No. P-2,166,867.7, published Apr. 22, 1976, describes a process where the reaction of trichlorosilane or methyldichlorosilane with a triene is catalyzed with platinum compounds to form bis-silyl olefins. The bis-silyl olefins are further reacted with polymeric unsaturated hydrocarbon chains in the presence of a Lewis acid and a metathesis catalyst to form polymeric hydrocarbons with reactive silyl terminal groups.

Brennan, U.S. Pat. No. 3,440,263, issued Apr. 22, 1969, describes a process in which olefinic compounds containing at least one ethylenic bond are reacted with siloxane polymers containing SiH bonds to form alkylated siloxanes. Platinum or platinum compounds supported on charcoal were reported as a suitable catalyst for the process.

Getson, U.S. Pat. No. 4,166,078, issued Aug. 28, 1979, describes a process where a modified polyorganosiloxane composition containing in situ generated particulate matter is prepared by reacting an poly(organohydrogen)siloxane with monomers containing aliphatic unsaturation in the presence of free radical initiators. Getson further describes a process where the modified polyorganosiloxane composition is reacted with a compound having at least two vinyl groups per molecule as a cross-linking agent and a catalyst which promotes the addition of SiH groups present in the modified polyorganosiloxane composition to vinyl groups of the cross-linking agent. Platinum is described as a suitable catalyst for the cross-linking process.

The object of the present invention is to provide a process for the production of cross-linked organofunctional siloxane compositions. The substitution of alpha,omega-trienes ($\alpha,\Omega$-trienes) for hydrogen on the silicon atoms of the siloxane is used to cross-link the siloxanes. The internal unsaturated bond of the $\alpha,\Omega$-triene is not effected by the platinum catalyst and thus remains intact imparting an organofunctionality to the cross-linked siloxane compositions. The amount of cross-linking of the siloxane compositions by the $\alpha,\Omega$-trienes is controlled by the addition of a triorganosilyl source, which can add across a terminal unsaturated bond of the $\alpha,\Omega$-triene. This allows for the level of cross-linking of the siloxane polymers to be varied while maintaining a constant level of organofunctionality and compatibility with organic compositions.

SUMMARY OF INVENTION

The present invention is novel cross-linked organofunctional polysiloxane and organofunctional cyclosiloxane compositions and a process for their preparation. The process for preparation of these siloxane compositions comprises contacting a mixture comprising a poly(organohydrogen)siloxane or a cyclo(organohydrogen)siloxane, a alpha,omega-triene, and a triorganosilyl source with a platinum catalyst, at a temperature within a range of 50° C. to 200° C. The products of this process are cross-linked organofunctional polysiloxanes and cross-linked organofunctional cyclosiloxanes. The triorganosilyl source added to the process provides for control of the amount of cross-linking of the organofunctional polysiloxanes and cyclosiloxanes independent of the level of organofunctionality.

DESCRIPTION OF INVENTION

The present invention is novel cross-linked organofunctional polysiloxane and organofunctional cyclosiloxane compositions and a process for their preparation. The process comprises:

(A) contacting a mixture comprising a poly(organohydrogen)siloxane described by formula $$R_3SiO(R_2SiO)_p(RHSiO)_qSiR_3, \text{ or} \qquad (1)$$

a cyclo(organohydrogen)siloxane described by formula $$(R_2SiO)_m(RHSiO)_n, \qquad (2)$$

a $\alpha,\Omega$-triene described by formula $$H_2C=CH(CH_2)_aCH=CH(CH_2)_bCH=CH_2, \qquad (3)$$

and a triorganosilyl source where each organic substituent of the triorganosilyl source comprises one to 20 carbon atoms, with a platinum catalyst, at a temperature within a range of 50° C. to 200° C. where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, p=0 to 198, q=2 to 200, p+q=2 to 200, m=0 to 18, n=2 to 20, m+n=4 to 20, a=1 to 20, and b=1 to 20; and (B) recovering cross-linked organofunctional polysiloxanes described by formula

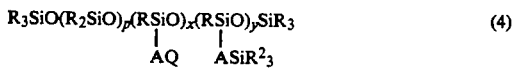

or cross-linked organofunctional cyclosiloxanes described by formula

where R, p, and m are as previously described, A is described by formula $-(CH_2)_{a+2}CH=CH(CH_2)_{b+2}-$ and a and b are as previously described, Q is a silicon atom of another organofunctional polysiloxane or organofunctional cyclosiloxane, each $R^2$ is an independently selected organic substituent comprising one to 20 carbon atoms, x=a to 199, y=1 to 199, $x+y=q$, c=1 to 19, d=1 to 19, and $c+d=n$.

The present process can be run as a continuous process or as a batch process in reactors of standard design. A batch process is preferred. When a homogeneous platinum catalyst is used in the process, the process can be run, for example, in a stirred-tank reactor. When a heterogeneous platinum catalyst is used in the process, the reactor can be, for example, a fixed-bed, a stirred-bed, or a fluidized-bed reactor.

In a typical batch-type process, a mixture comprising the $\alpha,\Omega$-triene and the platinum catalyst is formed in the reactor. Then, a second mixture comprising the poly(organohydrogen)siloxane or cyclo(organohydrogen)siloxane or a mixture thereof and the triorganosilyl source is added to the reactor at a rate to control heat build-up from the resultant exothermic reaction. For purposes of brevity, the term (organohydrogen)siloxane is hereafter used as a generic term encompassing both the poly(organohydrogen)siloxane and cyclo(organohydrogen)siloxane and mixtures of the two. In a continuous-type process, a mixture comprising the (organohydrogen)siloxane, $\alpha,\Omega$-triene, and triorganosilyl source can be contacted at a controlled rate with a particulate catalyst bed.

Optimal contact time for the (organohydrogen)siloxane, $\alpha,\Omega$-triene, and triorganosilyl source in the presence of the platinum catalyst, will depend upon such factors as the nature of the platinum catalyst, the chemical structures of the various reactants, and the temperature at which the process is conducted. In general, contact times of 15 minutes to five hours are considered useful. Contact times of 30 minutes to two hours are preferred. Shorter contact times may be used, but may result in reduced yield of the desired product. Longer contact times may also be used, but to no perceived advantage.

(Organohydrogen)siloxanes which can be reacted in the present process are described by formulas (1) and (2). The (organohydrogen)siloxanes contain substituents R, where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys. When R is a trialkylsiloxy, each of the alkyl groups of the trialkylsiloxy can comprise one to 20 carbon atoms. The radical R can be, for example, methyl, ethyl, propyl, isopropyl, tert-butyl, decyl, chloromethyl, 3,3,3-trifluoropropyl, cyclopentyl, cyclohexyl, cyclodecyl, phenyl, tolyl, xylyl, or trimethylsiloxy. Preferred is where R is methyl.

The poly(organohydrogen)siloxane is composed of randomly distributed diorganosiloxy groups of formula $(R_2SiO)_p$ and (organohydrogen)siloxy groups of formula $(RHSiO)_q$, where p can be a value from zero to 198, q can be a value of two to 200, and $p+q=2$ to 200. It is preferred that the sum of p and q be within a range of about 5 to 500. The optimal ratio of p to q will depend, upon the value of p+q, the degree of cross-linking, organofunctionality, and organic compatibility required. In general, it is preferred that p be a value within a range of about 2 to 50. More preferred is when p is a value within a range of about 2 to 10.

The cyclo(organohydrogen)siloxane is composed of randomly distributed diorganosiloxy groups of formula $(R_2SiO)_m$ and (organohydrogen)siloxy groups of formula $(RHSiO)_n$, where m can be a value from zero to 18, n can be a value from 2 to 20, and $n+m=4$ to 20. Preferred is where m=0 and n=4 to 7.

The $\alpha,\Omega$-trienes useful in the present process are described by formula (3), where both a and b are integers of one to 20. Preferred, is when a and b are integers of two to ten. The $\alpha,\Omega$-triene can be, for example, 1,4,7-octatriene; 1,5,9-decatriene; or 1,6,11-dodecatriene. Generally, the value of a and b in the recovered cross-linked organofunctional polysiloxanes and cyclosiloxanes will be the same value as in the original $\alpha,\Omega$-triene. However those skilled in the art will recognize that with some platinum catalysts, the remaining unsaturated bond may be shifted within the carbon chain resulting in different values for a and b in the products.

The $\alpha,\Omega$-triene is added to the process at a concentration such that the reactive terminal unsaturated bonds are present in slight stoichiometric excess in relation to the silicon bonded hydrogen present on the (organohydrogen)siloxanes. By slight stoichiometric excess is meant that there is a one percent to ten percent molar excess of terminal unsaturated bonds in relation to the silicon bonded hydrogen present on the (organohydrogen)siloxanes.

The process is run in the presence of a triorganosilyl source, where each organic substituent of the triorganosilyl comprises one to 20 carbon atoms. By triorganosilyl source, it is meant any material that under process conditions can effect silylation of a terminal olefinic bond of the $\alpha,\Omega$-triene. Each organic substituent of the triorganosilyl source can be independently selected from, for example, a group consisting of alkyls comprising one to 20 carbon atoms, haloalkyls comprising one to 20 carbon atoms, cycloalkyls comprising four to 20 carbon atoms, aryls and triorganosiloxy. Preferred is when each organic substituent of the triorganosilyl source is selected from a group consisting of methyl and phenyl. More preferred is when each of the organic substituents is methyl. The triorganosilyl source can be, for example, trimethylsilane, heptamethyltrisiloxane, or triphenylsilane.

A useful concentration of triorganosilyl source is where the mole ratio of available triorganosilyls is within a range of about 0.1 to 1.0 of the $\alpha,\Omega$-triene added to the process. Preferred is when the mole ratio is within a range of about 0.5 to 1.0

The mixture comprising the (organohydrogen)siloxane, $\alpha,\Omega$-triene, and triorganosilyl source is contacted with an effective concentration of a platinum catalyst specific for hydrosilylation of the terminal unsaturated carbon bonds of the α,Ω-triene. The platinum catalyst can be, for example, platinum metal, platinum compounds, or platinum complexes. The platinum catalyst can be, for example, platinum metal, $H_2PtCl_6.6H_2O$, $Pt°[(CH_2=CHMe_2Si)_2O]_2$, $Pt°[(CH_2=CHMe_2Si)_2O](CH_2CH_2CH_2)_2$, $K(C_2H_4PtCl_2)$, $(CH_2CH_2S)_2PtCl_2$, and dichlorobis(ethylene)-μ,μ-dichloroplatinum(II). Preferred is when the platinum catalyst is selected from a group consisting of platinum metal and $H_2PtCl_6.6H_2O$.

The present platinum catalyzed process may be run as either a homogeneous process or as a heterogeneous process. When the process is run as a heterogeneous process, the platinum catalyst may be supported on a solid support material. The solid support material can be any inert material of appropriate size and with the ability to retain the platinum catalyst. The platinum catalyst may be retained on or within the solid support material by standard means, for example, adsorption, ionic bonding, covalent bonding, or physical entrapment. The solid support material may be, for example, carbon, activated carbon, graphite, silica, silica gel, alumina, alumina-silica, and diatomaceous earth. A preferred solid support material is activated carbon. The solid support material can be in the form of, for example, particles, powders, flakes, chips, chunks, and pellets.

The size of the solid support material is not critical to the present invention. In general, solid support materials with diameters within a range of about 15μ to 10 mm are considered useful. The lower size limit is determined principally by the ability to handle and recover the supported platinum catalyst. The upper size limit is determined principally by the ability to provide sufficient platinum catalyst for the process to run at an economically reasonable rate. A preferred diameter for the solid support material is within a range of about 0.5 mm to 3.0 mm.

The weight of platinum catalyst retained on the solid support can be within a range of about 0.2 to 50 weight percent platinum. Preferred, is when the weight of platinum catalyst retained on the solid support is within a range of about 0.5 to 5.0 weight percent platinum. The weight percent of platinum on the solid support is calculated as the weight of platinum atoms retained by the solid support divided by the weight of the solid support, the quotient multiplied by 100.

A effective concentration of platinum catalyst in the present process is where the weight of platinum is about 0.0001 to 0.5 percent of the combined weight of the (organohydrogen)siloxane, α,Ω-triene, and triorganosilyl source added to the process. Preferred, is where the concentration of platinum atoms is about 0.001 to 0.1 weight percent of the combined weight of (organohydrogen)siloxane, α,Ω-triene, and triorganosilyl source added to the process.

The present process can be conducted at a temperature within a range of about 50° C. to 200° C. A preferred temperature for conducting the process is within a range of about 65° C. to 170° C. The preferred method for conducting the present process is by refluxing the reaction mixture at a temperature within a range of about 65° C. to 170° C.

To facilitate refluxing within the preferred temperature range, an inert organic solvent may be added to the process. Any organic solvent which is inert in the present process and has a boiling point within a range of about 50° C. to 200° C. may be used for this purpose. The organic solvent can be, for example, hexane, heptane, benzene, and toluene. The organic solvent may be present in the process within a weight range of about one to 30 weight percent of the combined weight of the (organohydrogen)siloxane, α,Ω-triene, and triorganosilyl source added to the process.

Recovery of cross-linked organofunctional polysiloxanes and cyclosiloxanes can be accomplished by standard means, for example, the products can be vacuum stripped, distilled, filtered, or any combination thereof. Recovery of the products may include retaining or using the products without further processing.

The recovered cross-linked organofunctional polysiloxanes and cyclosiloxanes are compatible in oils and waxes and can be used as additives to improve the slide properties of, for example, textile fibers. They can also be included internally in organic polymer materials to improve both processing and finishing properties.

The following example is provided to illustrate the present invention. The example is not intended to limit the claims provided herein.

EXAMPLE

Into a 200 ml round-bottom flask was added 20.0 g of 1,5,9-decatriene, 2 g of hexane, and 1.0 g of 0.5% platinum on carbon catalyst. The platinum on carbon catalyst was purchased from Engelhard (Newark, N.J.) and consisted of 0.5% w/w platinum on 4×8 mesh activated carbon particles. This mixture was heated to 100° C. and then a second mixture comprising 8.8 g of (MeHSiO)$_4$ and 32.6 g of HMeSi(OSiMe$_3$)$_2$ was slowly added to the first mixture. The temperature of the combined mixtures was 140° C. after completion of the addition of the second mixture. The temperature was then raised to 150° C. for one hour. The final product mixture was allowed to cool for about 16 hours and then stripped of volatiles by heating under vacuum. A total of 57.6 g of product fluid was recovered. Analysis of the product by Fourier transform infrared spectroscopy showed little SiH present as evidenced by a small absorption band between 2100–2200 cm$^{-1}$. The product had a viscosity of 1440 cs, refractive index of 1.4439, and density of 0.93 g/mL.

I claim:
1. A process for the preparation of cross-linked organofunctional polysiloxanes, the process comprising:
   (A) contacting a mixture comprising a poly(organohydrogen)siloxane described by formula

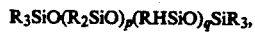

$R_3SiO(R_2SiO)_p(RHSiO)_qSiR_3$, a α,Ω-triene described by formula

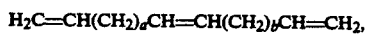

$H_2C=CH(CH_2)_aCH=CH(CH_2)_bCH=CH_2$, and a triorganosilyl source where each organic substituent of the triorganosilyl source comprises one to 20 carbon atoms, with a platinum catalyst, at a temperature within a range of 50° C. to 200° C. where each R is a radical independently selected from a group consisting of alkyls comprising one to 20 carbon atoms, haloalkyls comprising one to 20 carbon atoms, cycloalkyls of four to 20 carbon atoms, aryls, and trialkylsiloxys with each alkyl of the trialkylsiloxys comprising from one to 20 carbon atoms, p=0 to 198, q=2 to 200, a=1 to 20, and b=1 to 20; and (B) recovering cross-linked organofunctional polysiloxanes of formula

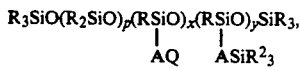

where R and p are as previously described, A is described by formula $-(CH_2)_{a+2}CH=CH(CH_2)_{b+2}-$ and a and b are as previously described, Q is a silicon atom of another organofunctional polysiloxane, each $R^2$ is a independently selected organic substituent comprising one to 20 carbon atoms, $x=1$ to 199, $y=1$ to 199, and $x+y=q$.

2. A process according to claim 1, where contacting the mixture with the platinum catalyst is for a contact time of 30 minutes to two hours.

3. A process according to claim 1, where R is methyl.

4. A process according to claim 1, where p is a value within a range of about 2 to 10 and $p+q=5$ to 100.

5. A process according to claim 1, where $a=2$ to 10 and $b=2$ to 10.

6. A process according to claim 1, where the platinum catalyst is selected from a group consisting of platinum metal and $H_2PtCl_6.6H_2O$.

7. A process according to claim 1, where the platinum catalyst is supported on a solid support.

8. A process according to claim 1, where the platinum catalyst is platinum metal supported on activated carbon.

9. A process according to clam 1, where the platinum catalyst is present at a platinum concentration of about 0.001 to 0.1 weight percent of the combined weight of the poly(organohydrogen)siloxane, the $\alpha,\Omega$-triene, and the triorganosilyl source added to the process.

10. A process according to claim 1, where the temperature is within a range of about 65° C. to 170° C.

11. A process according to claim 1, where an inert organic solvent having a boiling point within a range of about 50° C. to 200° C. is present in the process.

12. A process according to claim 1, where the triorganosilyl source is selected from a group consisting of trimethylsilane, heptamethyltrisiloxane, and triphenylsilane.

13. A process according to claim 1, where the mole ratio of available triorganosilyl from the triorganosilyl source to the $\alpha,\Omega$-triene is about 0.5 to 1.0.

14. A composition comprising cross-linked organofunctional polysiloxanes described by formula:

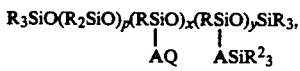

where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, A is described by formula $-(CH_2)_{a+2}CH=CH(CH_2)_{b+2}13$, Q is a silicon atom of another organofunctional polysiloxane, each $R^2$ is an independently selected organic substituent comprising one to 20 carbon atoms, $p=0$ to 198, $x=1$ to 199, $y=1$ to 199, $p+x+y=2$ to 200, $a=1$ to 20, and $b=1$ to 20.

15. A composition according to claim 14, where R is methyl, $p=2$ to 10, and $p+x+y=5$ to 100.

16. A composition according to claim 14, where each $R^2$ is methyl.

17. A process for the preparation of cross-linked organofunctional cyclosiloxanes, the process comprising:

(A) contacting a mixture comprising a cyclo(organohydrogen) siloxane described by formula

a $\alpha,\Omega$-triene described by formula

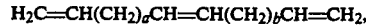

and a triorganosilyl source where each organic substituent of the triorganosilyl source comprises one to 20 carbon atoms, with a platinum catalyst, at a temperature within a range of 50° C. to 200° C. where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, $m=0$ to 18, $n=2$ to 20, $m+n=4$ to 20, $a=1$ to 20, and $b=1$ to 20; and (b) recovering cross-linked organofunctional cyclosiloxanes described by formula

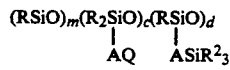

where R and m are as previously described, A is described by formula $-(CH_2)_{a+2}CH=CH(CH_2)_{b+2}-$ and a and b are as previously described, Q is a silicon atom of another organofunctional cyclosiloxane, each $R^2$ is a independently selected organic substituent comprising one to 20 carbon atoms, $c=1$ to 19, $d=1$ to 19, and $c+d=n$.

18. A process according to claim 17, where contacting the mixture with the platinum catalyst is for a contact time of 30 minutes to two hours.

19. A process according to claim 17, where R is methyl.

20. A process according to claim 17, where $m=0$ and $n=4$ to 7.

21. A process according to claim 17, where $a=2$ to 10 and $b=2$ to 10.

22. A process according to claim 17, where the platinum catalyst is selected from a group consisting of platinum metal and $H_2PtCl_6.6H_2O$.

23. A process according to claim 17, where the platinum catalyst is supported on a solid support.

24. A process according to claim 17, where the platinum catalyst is platinum metal supported on activated carbon.

25. A process according to claim 17, where the platinum catalyst is present at a platinum concentration of about 0.001 to 0.1 weight percent of the combined weight of the cyclo(organohydrogen)siloxane, $\alpha,\Omega$-triene, and triorganosilyl source added to the process.

26. A process according to claim 17, where the temperature is within a range of about 65° C. to 170° C.

27. A process according to claim 17, where an inert organic solvent having a boiling point within a range of about 50° C. to 200° C. is present in the process.

28. A process according to claim 17, where the triorganosilyl source is selected from a group consisting of trimethylsilane, heptamethyltrisiloxane, and triphenylsilane.

29. A process according to claim 17, where the mole ratio of available triorganosilyl from the triorganosilyl source to the $\alpha,\Omega$-triene is about 0.5 to 1.0.

30. A composition comprising cross-linked organofunctional cyclosiloxanes described by formula

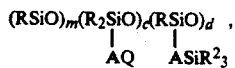

where each R is a radical independently selected from a group consisting of alkyls comprising one to 20 carbon atoms, haloalkyls comprising one to 20 carbon atoms, cycloalkyls comprising four to 20 carbon atoms, aryls, and trialkylsiloxys with each alkyl of the trialkylsiloxys comprising one to 20 carbon atoms, A is described by formula $-(CH_2)_{a+2}CH=CH(CH_2)_{b+2}-$, Z is a silicon atom of another organofunctional cyclosiloxane, each $R^2$ is an independently selected organic substituent comprising one to 20 carbon atoms, $m=0$ to 18, $c=1$ to 19, $d=1$ to 19, $m+c+d=4$ to 20, $a=1$ to 20, and $b=1$ to 20.

31. A composition according to claim 30, where R is methyl, $m=0$, and $c+d=4$ to 7.

32. A composition according to claim 31, where each $R^2$ is methyl.

* * * * *